United States Patent
Guan et al.

(10) Patent No.: US 7,777,987 B2
(45) Date of Patent: Aug. 17, 2010

(54) PERPENDICULAR WRITE HEAD WITH TAPERED MAIN POLE

(75) Inventors: Lijie Guan, Milpitas, CA (US); Hung Liang Hu, Los Altos Hills, CA (US); Yaw Shing Tang, Saratoga, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 12/384,691

(22) Filed: Apr. 8, 2009

(65) Prior Publication Data

US 2009/0207525 A1    Aug. 20, 2009

Related U.S. Application Data

(62) Division of application No. 10/818,577, filed on Apr. 6, 2004, now abandoned.

(51) Int. Cl.
G11B 5/11 (2006.01)
(52) U.S. Cl. .................................................. 360/125.3
(58) Field of Classification Search ............ 360/125.02, 360/125.03, 125.06, 125.08, 125.1, 125.13, 360/125.14, 125.16, 125.24, 125.26, 125.28, 360/125.3
See application file for complete search history.

(56) References Cited

U.S. PATENT DOCUMENTS

| | | | |
|---|---|---|---|
| 5,173,821 A | | 12/1992 | Maloney |
| 5,600,519 A | | 2/1997 | Heim et al. |
| 6,501,619 B1 * | 12/2002 | Sherrer et al. ........... 360/125.03 |
| 6,809,901 B2 * | 10/2004 | Minor ................... 360/125.12 |
| 7,006,326 B2 * | 2/2006 | Okada et al. ........... 360/125.13 |
| 7,100,266 B2 * | 9/2006 | Plumer et al. ............ 29/603.14 |
| 7,133,252 B2 * | 11/2006 | Takano et al. .......... 360/125.13 |
| 7,159,302 B2 * | 1/2007 | Feldbaum et al. ........ 29/603.12 |
| 7,196,871 B2 * | 3/2007 | Hsu et al. ............... 360/125.03 |
| 7,212,379 B2 * | 5/2007 | Hsu et al. .............. 360/125.16 |

(Continued)

FOREIGN PATENT DOCUMENTS

JP    2002-092820    3/2002

(Continued)

OTHER PUBLICATIONS

"Perpendicular recording: the promise and the problems," by Roger Wood et al., Journal of Magnetism and Magnetic Materials 235, (2001) 1-9, NH Elsevier.

(Continued)

*Primary Examiner*—Angel A. Castro
(74) *Attorney, Agent, or Firm*—Saile Ackerman LLC; Stephen B. Ackerman (57) ABSTRACT

Prior art designs of single pole writers have been limited by premature saturation at the tip. This limits the head field that can be achieved without simultaneously widening the write profile. This problem has bee solved by means of a vertical main pole whose thickness has its conventional value a short distance from the tip but that tapers down to a significantly reduced value as it approaches the tip. A process for manufacturing this tapered tip design is also presented.

10 Claims, 7 Drawing Sheets

U.S. PATENT DOCUMENTS

| | | | |
|---|---|---|---|
| 7,324,304 B1 * | 1/2008 | Benakli et al. | 360/125.33 |
| 7,417,824 B2 * | 8/2008 | Kameda | 360/125.02 |
| 2004/0047079 A1 * | 3/2004 | Ito et al. | 360/317 |
| 2006/0256471 A1 * | 11/2006 | Plumer et al. | 360/122 |

FOREIGN PATENT DOCUMENTS

| | | |
|---|---|---|
| JP | 2002-217029 | 8/2002 |
| JP | 2003-006811 | 1/2003 |
| JP | 2003-016608 | 1/2003 |
| JP | 2004-127480 | 4/2004 |
| JP | 2005-293822 | 10/2005 |

OTHER PUBLICATIONS

"Design Considerations for Single-Pole-Type Write Heads," by Joshua Schare et al., IEEE Transactions on Magnetics, vol. 39, No. 3, May 2003, pp. 1842-1845.

"Micromagnetics of perpendicular write heads with extremely small pole tip dimensions," by Daniel Z. Bai et al., Journal of Applied Physics, vol. 91, No. 10, May 15, 2002, pp. 6833-6835.

* cited by examiner

PERPENDICULAR WRITE HEAD WITH TAPERED MAIN POLE

This is a divisional application of U.S. patent application Ser. No. 10/818,577, filed on Apr. 6, 2004, now abandoned which is herein incorporated by reference in its entirety, and assigned to a common assignee.

FIELD OF THE INVENTION

The invention relates to the general field of magnetic disk systems with particular reference to perpendicular write poles and controlling flux therefrom.

BACKGROUND OF THE INVENTION

One of the key advantages of single-pole (SP) head/media, with a magnetically soft underlayer (SUL) and perpendicular recording system, is the capability of providing a larger write field (than that of a ring head) to enable writing into the relatively thick media with high anisotropy constant. The latter quality leads one to assume better thermal stability associated with perpendicular recording. However, this advantage is diminished as the dimension of the pole tip is reduced to increase the areal recording density [1]. So, the tradeoff between head writing field and thermal stability may still limit the achievable areal density for perpendicular recording.

Figure 1:
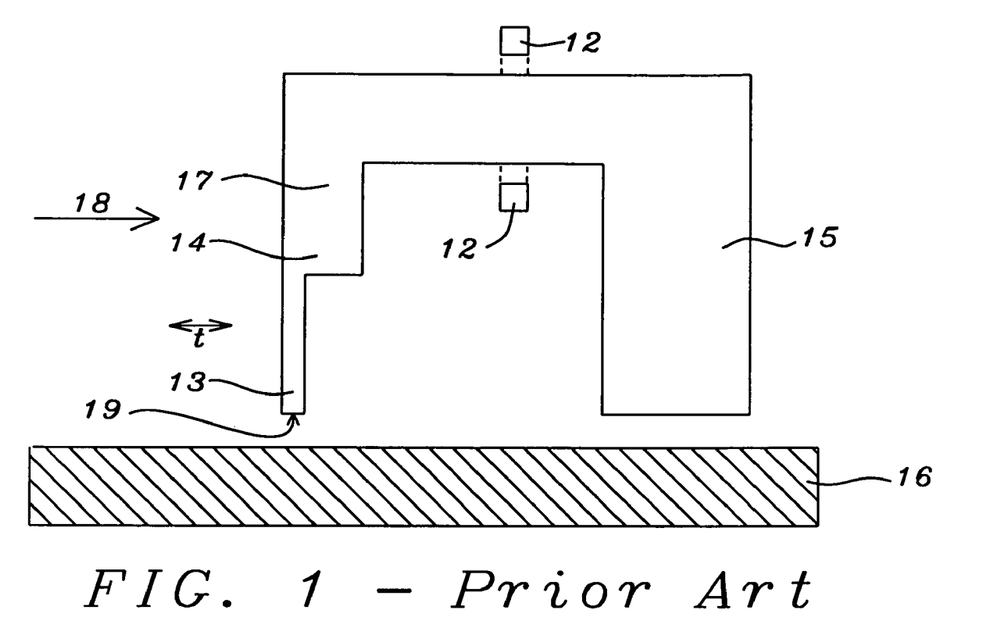
FIG. 1 shows a single vertical pole magnetic writer of the prior art.

FIG. 1 is a schematic representation of a typical single pole vertical recording system of the prior art. Seen there is single write pole 13 whose ABS (air bearing surface) moves parallel, and close to, the surface of recording medium 16. The latter comprises an upper, high coercivity, layer (not shown) on a magnetically soft underlayer. Coils 12 generate magnetic flux in yoke 14 which passes through main pole 14 into tip 13 and then into media 16 (where a bit is written). The magnetic circuit is completed by flux that passes through the soft under layer and then back into return pole 15. The space enclosed by the yoke and poles is normally filled with insulating material 17.

Figure 2:
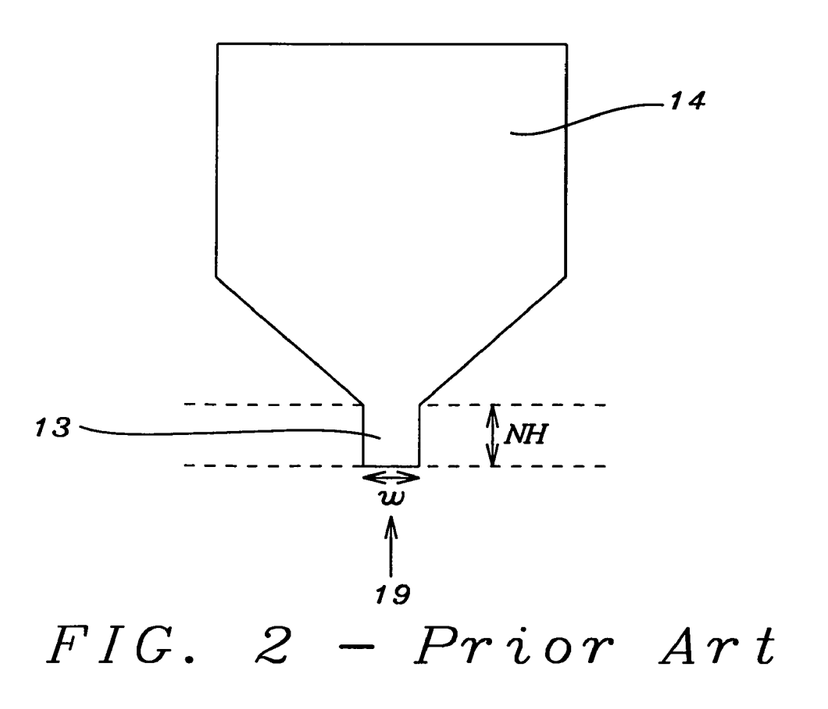
FIG. 2 is a head-on view of the structure of FIG. 1.

FIG. 2 is a front view of the structure shown in FIG. 1 when viewed along direction 18.

Figure 3:
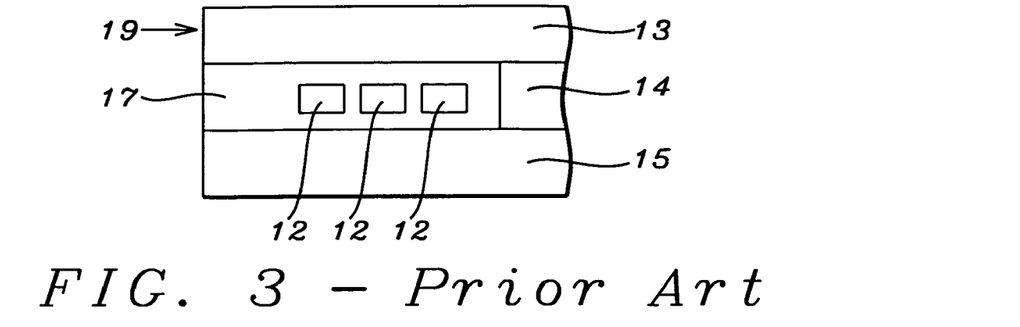
FIG. 3 is a closer view of the pole tip portion of a vertical writer

An enlarged view of the write and return poles is shown in FIG. 3. In this prior art design, the main pole 13 is about 0.1 to 0.4 microns thick at the ABS 19. The main pole is made of a high moment material, such as CoFe having a saturation magnetization, Bs, of about 2.4 T, but, in practice, this main pole does not saturate, except at the pole tip region. Thus the maximum write field in the media is mainly determined by the saturation level of the pole tip and the solid angle opened by the ABS of the pole tip.

To increase the write field, large W and t and small NH are preferred (as defined in FIGS. 1 and 2). However, for ultra-high density recording, track width W is limited by the track density requirement. To have good control of track width W, NH cannot be reduced to the extent desired due to the rounding effect of the photo mask used to pattern it. A small neck height also increases the side-fringing field and causes adjacent track erasure (ATE) [2].

A large pole width t will result in head skew problems [3]. Thus better methods for compensating field loss at ultra-high recording densities are essential. The present invention discloses a novel structure for a perpendicular write head that overcomes these problems.

REFERENCES (1) Z. Bai, and J.-G. Zhu, "Micromagnetics of Perpendicular Write Heads with Small Pole-Tip Dimensions", J. Appl. Phys, vol. 91, 6833 (2001).

(2) J. Schare, L. Guan, J. G. Zhu, and M. Kryder, "Design Considerations for Single-Pole Type Write Heads", IEEE Tran. Magn., May, 2003

(3) R. Wood, T. Sonobe, Z. Jin, and B. Wilson, "Perpendicular recording: the promise and the problems", J. Magn. Magn. Mater., vol 235, 1 (2001)

A routine search of the prior art was performed with the following references of interest being found:

U.S. Pat. No. 5,600,519 (Heim et al) discloses a tapered main pole as does U.S. Pat. No. 5,173,821 (Maloney).

SUMMARY OF THE INVENTION

It has been an object of at least one embodiment of the present invention to provide a single pole vertical write head having both a large head field as well as good spatial resolution.

Another object of at least one embodiment of the present invention has been to provide a process for manufacturing said vertical writer.

A further object of at least one embodiment of the present invention has been that said process introduce little or no changes to current processes for manufacturing vertical writers.

These objects have been achieved by means of a vertical main pole whose thickness has its conventional value a short distance from the tip but that tapers down to a significantly reduced value as it approaches the tip. Typically, the distance over which this tapering takes place is about 0.1 to 4 microns. In order to manufacture this structure, a trench is etched, using ion milling, partly into the yoke region and partly into the insulated coil well. Said trench has sides whose slope is carefully controlled through adjustment of the angle of incidence of the ion beam, this slope determining the aforementioned taper. After the trench has been just filled with a high moment layer, a second high moment layer is deposited to complete formation of the pole tip. After an appropriate lapping step to define the ABS, the process is complete.

DESCRIPTION OF THE PREFERRED EMBODIMENTS

We will disclose the present invention through a description of a process for its manufacture. This description will also serve to make clear the structure of the present invention.

Figure 4:
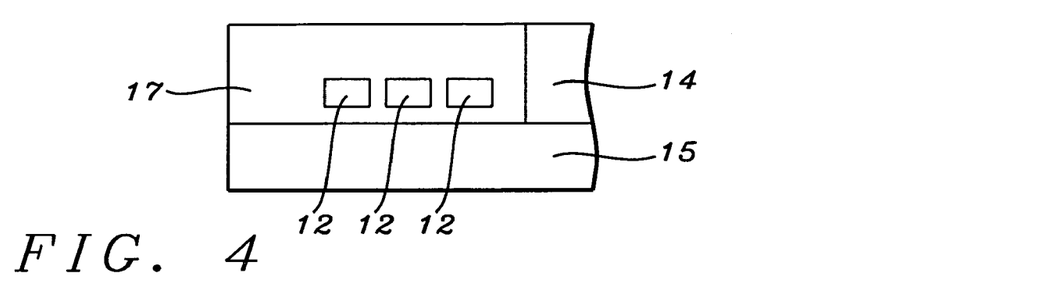
FIG. 4 shows the starting point for the process of the present invention.

Referring now to FIG. 4, the process of the present invention begins with the formation of return pole layer 15 on a substrate (not shown). Layer 15 is any of Ni, Fe, or Co, or their alloys and it is deposited to a thickness between about 0.5 and 5 microns. This is followed by the formation of magnetic yoke 14 that includes a well within which is coil 12 embedded in layer of insulation 17. Yoke 14 is a material such as Ni, Fe, Co, or their alloys.

Figure 5:
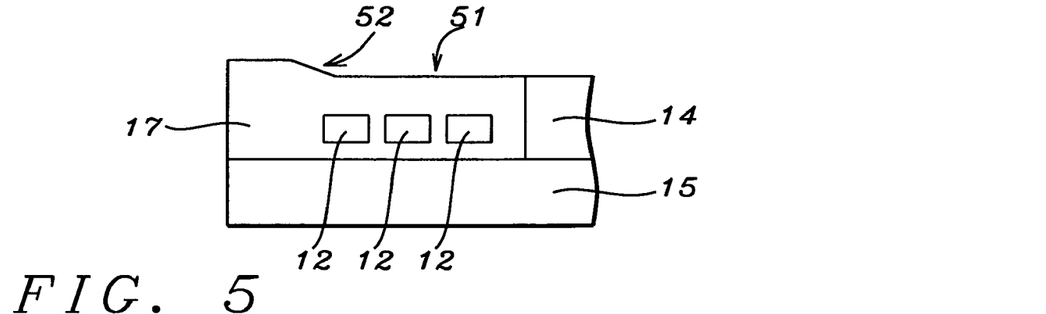
FIGS. 5 and 6 illustrate formation and filling of a trench with a high moment material.

Now follows a key novel feature, namely the formation of trench 51, as shown in FIG. 5. Ion beam milling is most commonly used to form said trench whose depth is typically between about 0.1 and 2 microns, this depth being controlled through adjustment of the ion beam's dose and duration. Walls 52 of trench 51 have sloping sides as shown in the figure. The sides of the trench slope at an angle between about 15 and 65 degrees from vertical, slope angle being controlled through adjustment of the ion beam's angle of incidence.

Figure 6:
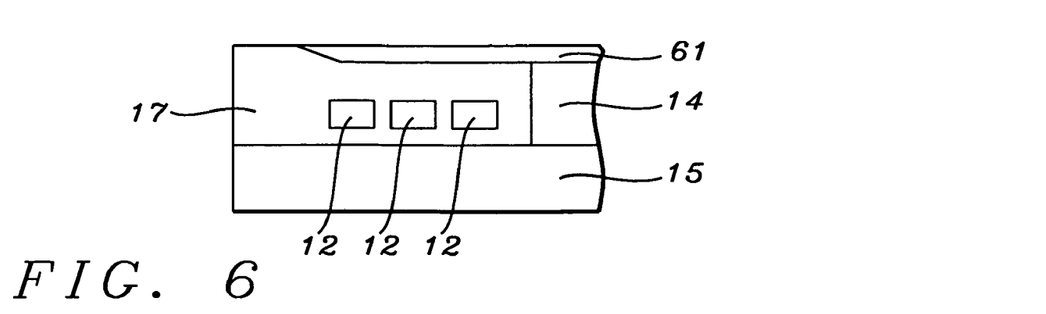

Trench 52 is then overfilled with layer 61 of a material capable of a magnetic moment of at least 1.8 T and is then planarized until insulation layer 17 is just exposed, as illustrated in FIG. 6. Layer 61 should have high $B_s$ and is any of Ni, Fe, or Co, or their alloys.

Figures 7, 8:
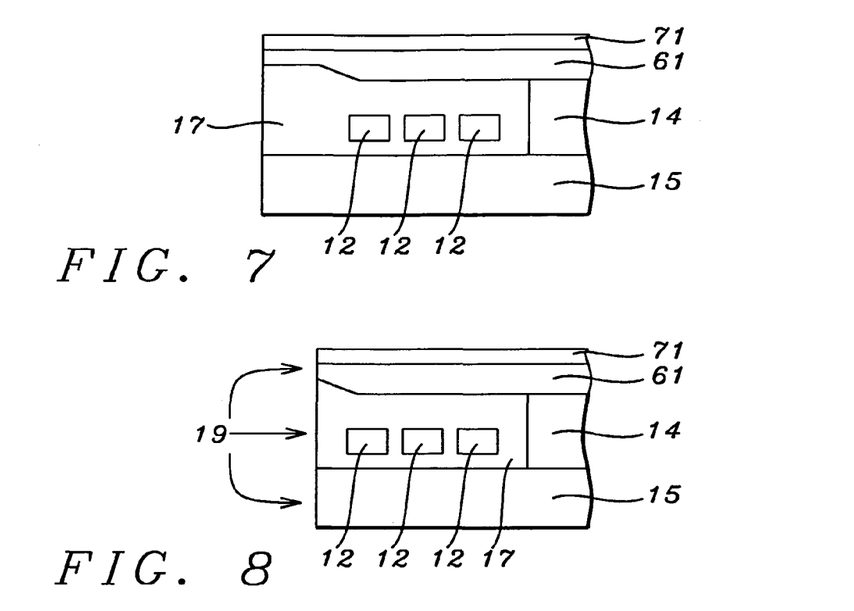
FIG. 7 shows deposition of a second layer of high moment material over the afore-mentioned first layer.
FIG. 8 shows the final structure.

Next, as seen in FIG. 7, layer 71 of a material capable of a magnetic moment of at least 2 T, is deposited. Layer 71 is any of Ni, Fe, or Co, or their alloys. This essentially completes formation of the magnetic write head which, as can be seen, now includes a tapered single vertical pole. All that remains to be done is to form air bearing surface 19 through planarizing in a plane normal to the upper surface of layer 71. The final structure is seen in FIG. 8.

Figure 9:
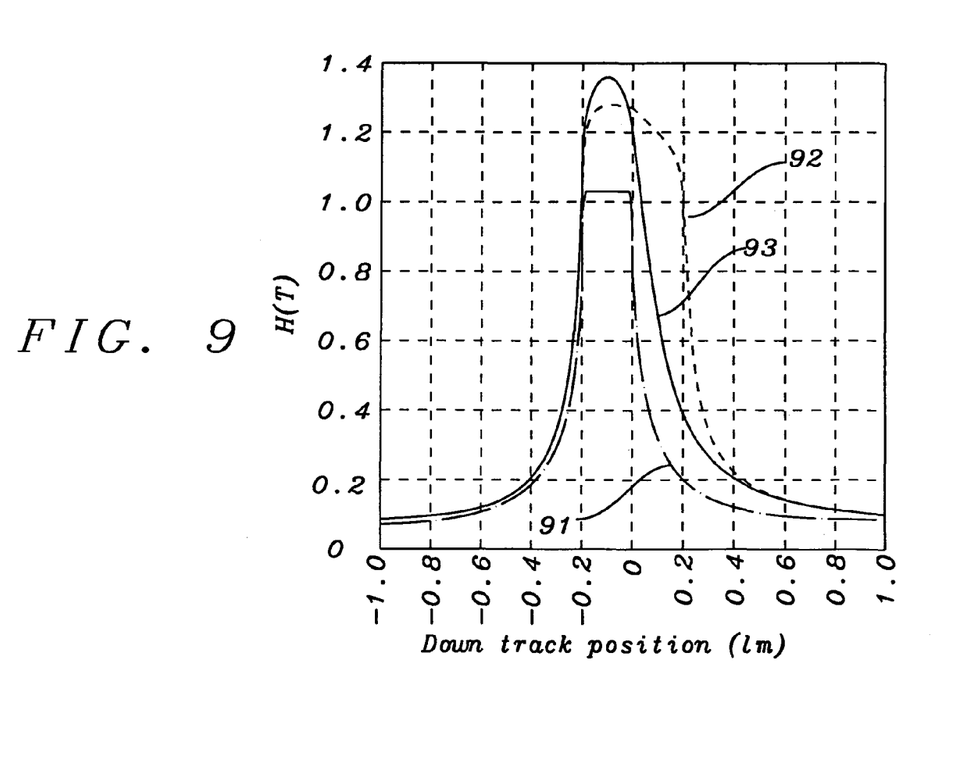
FIG. 9 compares the magnitude and spatial distribution of the head field in a device made according to the present invention with two prior art devices.

FIG. 9 compares calculated plots of the head field (in Tesla) as a function its downtrack position (in microns) for three cases: Curve 91 is a conventional straight pole design having t=0.2 microns. Curve 92 is a straight main pole having t=0.4 microns, while curve 93 is for a tapered main pole (present invention) (t1=t2=0.2 microns, and NH=0). These data make it clear that the head field can be increased by providing a thicker main pole (curve 92) but this comes with an accompanying problem that the head field could erase data on adjacent tracks when the head is skewed. On the other hand, a main pole designed according to the teachings of the present invention (curve 93) achieves a head field even larger than that of the thicker, but conventional, pole with less erasure problems for the same head skew angle because of smaller pole thickness at the ABS.

Figure 10:
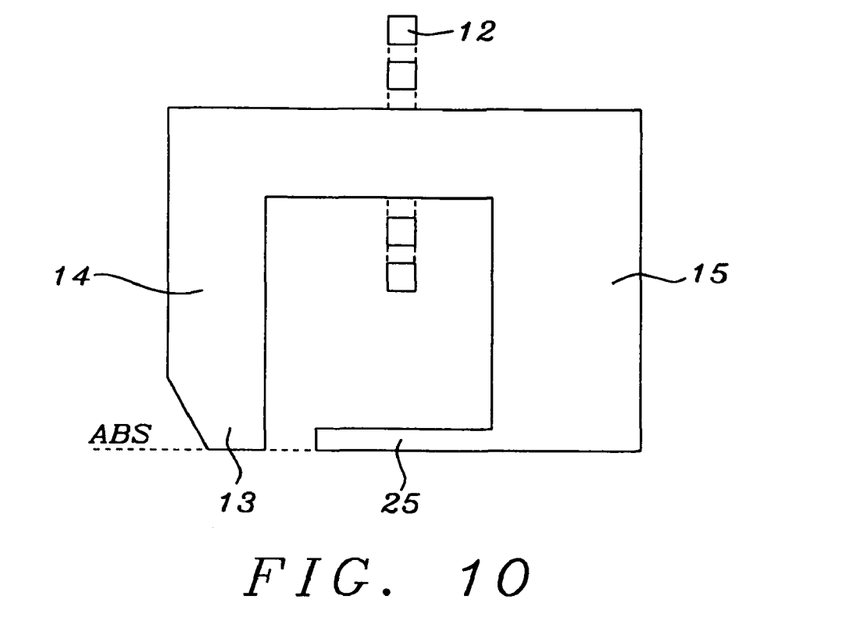
FIG. 10 is a cross-section of the write head, including an ABS level shield.
Figure 11:
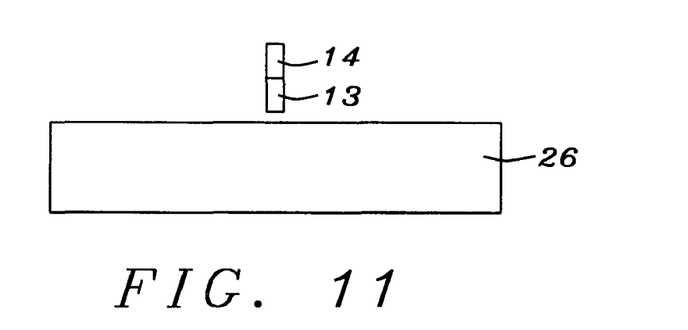
FIG. 11 is an ABS view of FIG. 10 for a single trailing edge shield.
Figure 12:
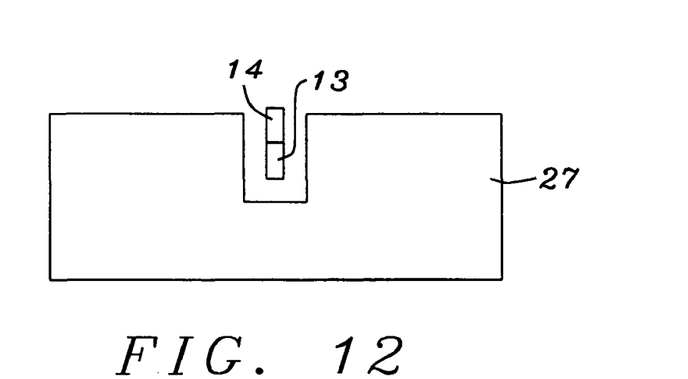
FIG. 12 is said ABS view for a shield that surrounds the main pole on three sides.

The concept of a tapered main pole is not limited to only single pole perpendicular writers, but is also applicable to a shielded pole type perpendicular write head, a cross-section of which is shown in FIG. 10 with the shield being designated as element 25. Shield designs may vary. For example, in FIG. 11 we show an ABS view of shield 26 which is located on only one side (the trailing edge), while in FIG. 12 we show shield 27 that surrounds the main pole on three sides (trailing edge and two sides in the cross-track).

Figure 13:
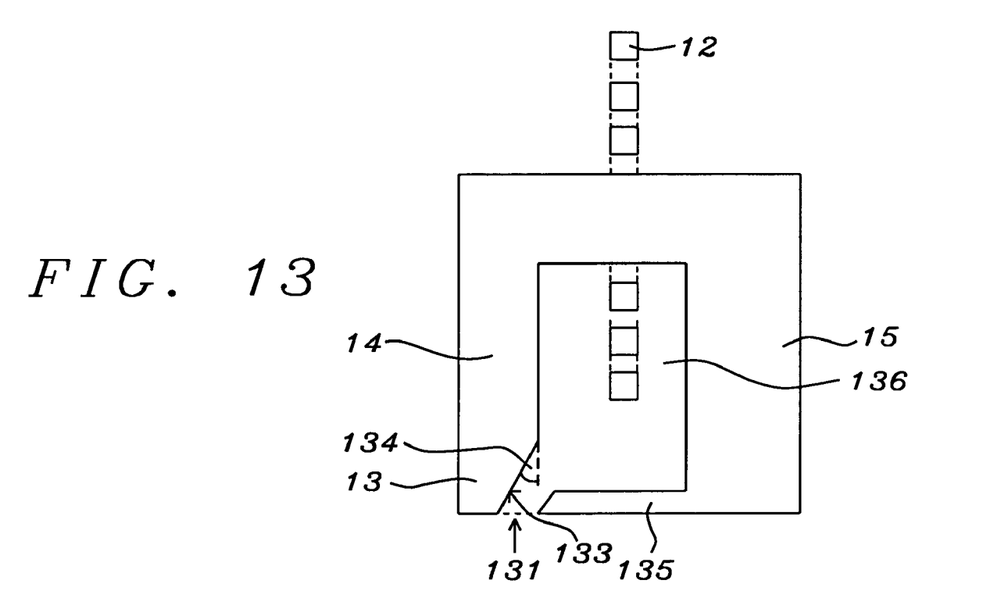
FIG. 13 is an example of a tapered main pole at a trailing edge combined with a trailing shield

In addition to the previously described tapered main pole structure at a leading edge, a tapered main pole at a trailing edge, combined with trailing shield 135, is disclosed here, as shown in FIG. 13. Note that the trailing shield is tapered to the same angle as the main pole, thereby maintaining a constant horizontal distance 131 therefrom.

Figure 14:
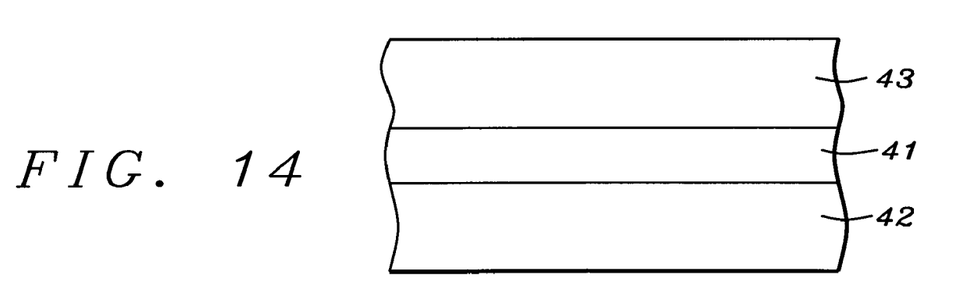
FIGS. 14-20 illustrate the process for making the structure shown in FIG. 13.
Figure 15:
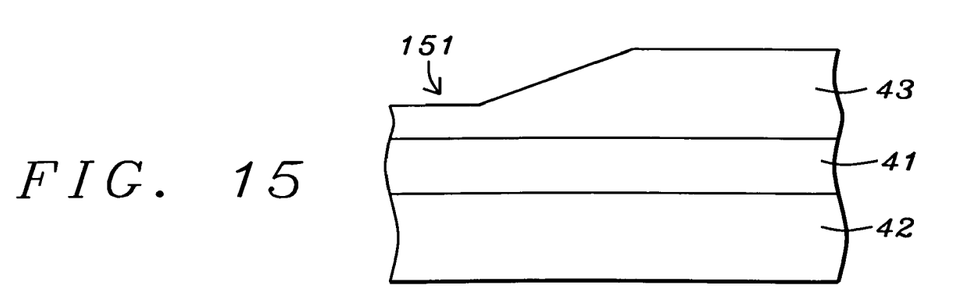
Figure 16:
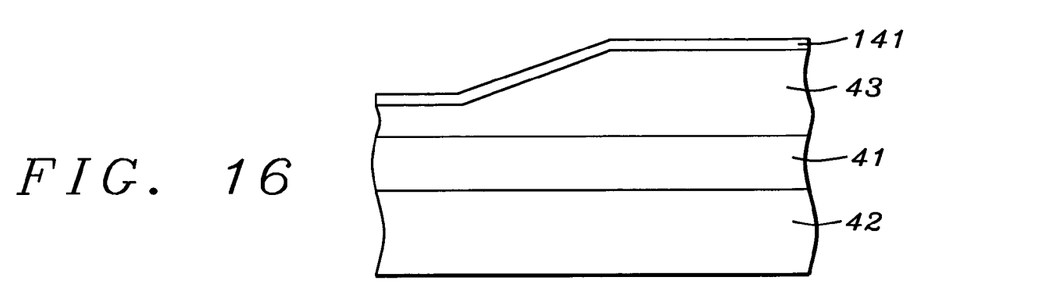
Figure 17:
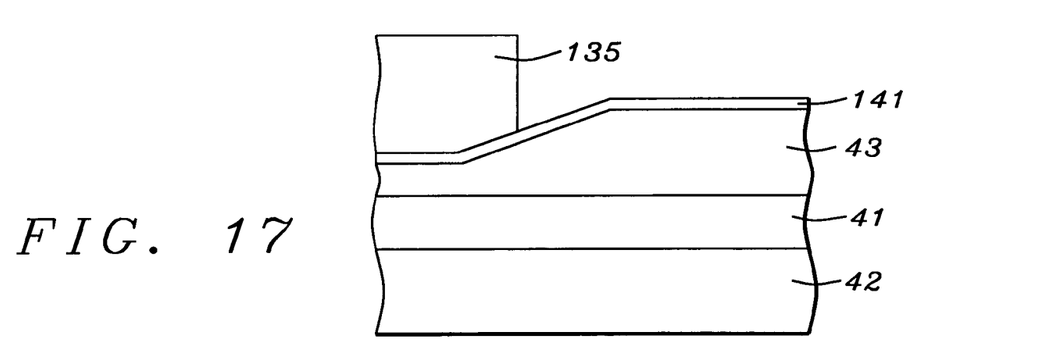
Figure 18:
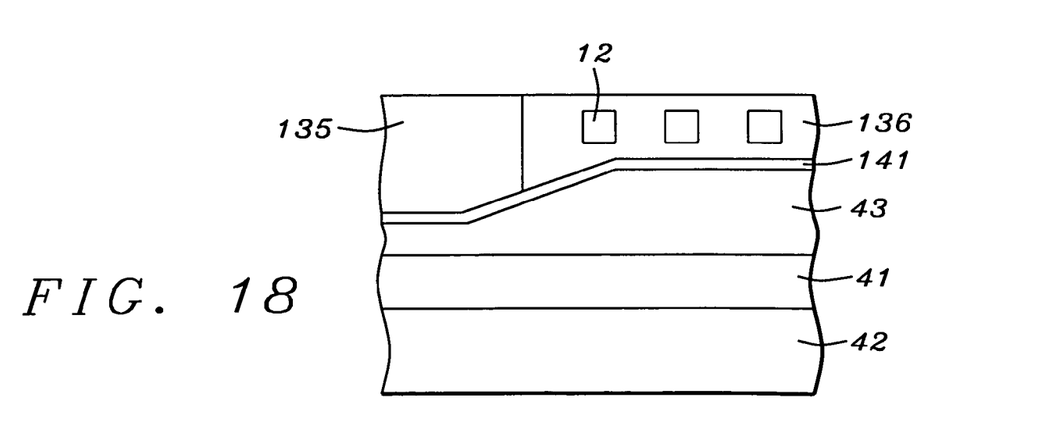
Figure 19:
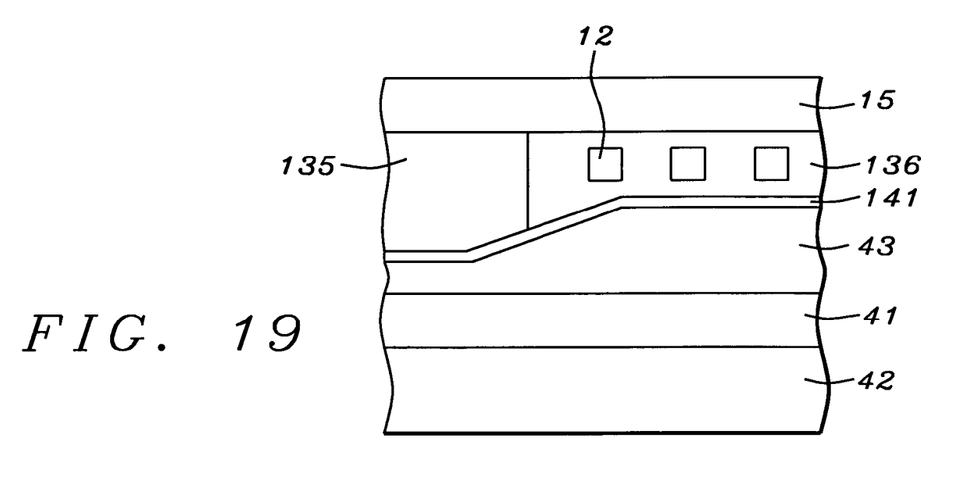
Figure 20:
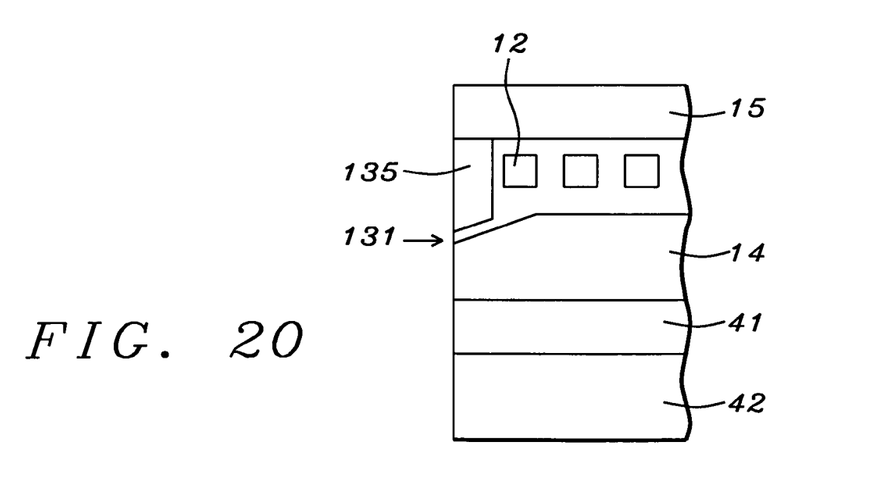

The major process steps to make this trailing-edge-tapered main pole with trailing shield are illustrated in FIGS. 14-20. FIG. 14 shows the starting point for manufacturing the writer once the reader structure has been completed. First, isolation 41 layer (usually $Al_2O_3$, between about 1 and 3 um thick) is deposited on the top reader shield 42, followed by layer 43 of high Bs materials (Co, Fe and their alloys, Bs~2.4 T, thickness about 0.2 to 2 um), which will eventually form the main pole. In FIG. 15, an etching process similar to that shown in FIG. 5, is applied to form trench 151, whose slope angle defines the taper angle of the main pole. Subsequently, the process to define main pole track width is applied so the front geometry of the main pole (as in FIG. 2) is formed. In FIG. 16 non-magnetic layer 141 (usually $Al_2O_3$, 0.03 to 0.2 um thick) is deposited to serve as the gap between the trailing shield and main pole. In FIG. 17, trailing shield 135 (alloys of Co, Fe, Ni, Bs around 1.0-2.0 T) is deposited on top of gap layer 141. In FIG. 18, coils 12 are made. Then the whole structure is filled with $Al_2O_3$ and polished to expose the top surface of the trailing shield. In FIG. 19, the return pole (alloys of Co, Fe, Ni, Bs around 1.0-2.0 T, thickness=0.5-5.0 um) is deposited and connected with the trailing shield. Finally, in FIG. 20, lapping is applied to define the ABS of the head.

What is claimed is:

1. A magnetic write head, having a tapered single vertical pole, comprising:
    a return pole layer on a substrate;
    on said return pole layer, a magnetic yoke that includes a well within which is a coil embedded in a layer of insulation that shares a common first upper surface with said yoke;
    a trench, having a sloping side, that extends downwards from said first upper surface;
    said trench being filled with a layer of a first material capable of a magnetic moment of at least 1.8 T and a second upper surface;
    on said second upper surface, a layer of a second material capable of a magnetic moment of at least 2 T;
    a trailing shield that is tapered to have a surface that is parallel to said tapered single vertical pole; and
    an air bearing surface in a plane normal to said upper surfaces.

2. The magnetic write head described in claim 1 wherein said return pole is deposited to a thickness between about 0.5 and 5 microns.

3. The magnetic write head described in claim 1 wherein said return pole is a material selected from the group consisting of Ni, Fe, Co, and their alloys.

4. The magnetic write head described in claim 1 wherein said coil well has a depth of between about 0.5 and 4 microns.

5. The magnetic write head described in claim 1 wherein said insulating layer is aluminum oxide.

6. The magnetic write head described in claim 1 wherein said trench has a depth that is between about 0.2 and 3 microns.

7. The magnetic write head described in claim 1 wherein the sides of the trench slope at an angle between about 15 and 65 degrees from vertical.

8. The magnetic write head described in claim 1 wherein said yoke is a material selected from the group consisting of Ni, Fe, Co, and their alloys.

9. The magnetic write head described in claim 1 wherein said layer of a first material that is capable of a magnetic moment of at least 1.8 T is a material selected from the group consisting of Ni, Fe, Co, and their alloys.

10. The magnetic write head described in claim 1 wherein said layer of a second material that is capable of a magnetic moment of at least 2 T is a material selected from the group consisting of Ni, Fe, Co, and their alloys.

* * * * *